April 5, 1938.  M. HIGGS  2,113,085
FOOD CHOPPER
Filed Dec. 21, 1935

Melvin Higgs
INVENTOR

Patented Apr. 5, 1938

2,113,085

UNITED STATES PATENT OFFICE 2,113,085

FOOD CHOPPER

Melvin Higgs, Pomona, Calif.

Application December 21, 1935, Serial No. 55,604

3 Claims. (Cl. 30—305)

This invention is a food chopper so made that it will cut vegetables or fruits in strips, squares or in fine pieces; that it will not clog or pick up the cut pieces, and can be used in a chopping bowl or on a flat board.

It comprises a set of three, parallel blades which readily cut the food substance and provide an arrangement including a handle on one end of which the blades are individually, pivotally attached so as to provide for a relative rocking between the blades and the handle to facilitate the cutting strokes of the device.

Other objects and features will be set forth hereinafter.

Figures 1, 2:
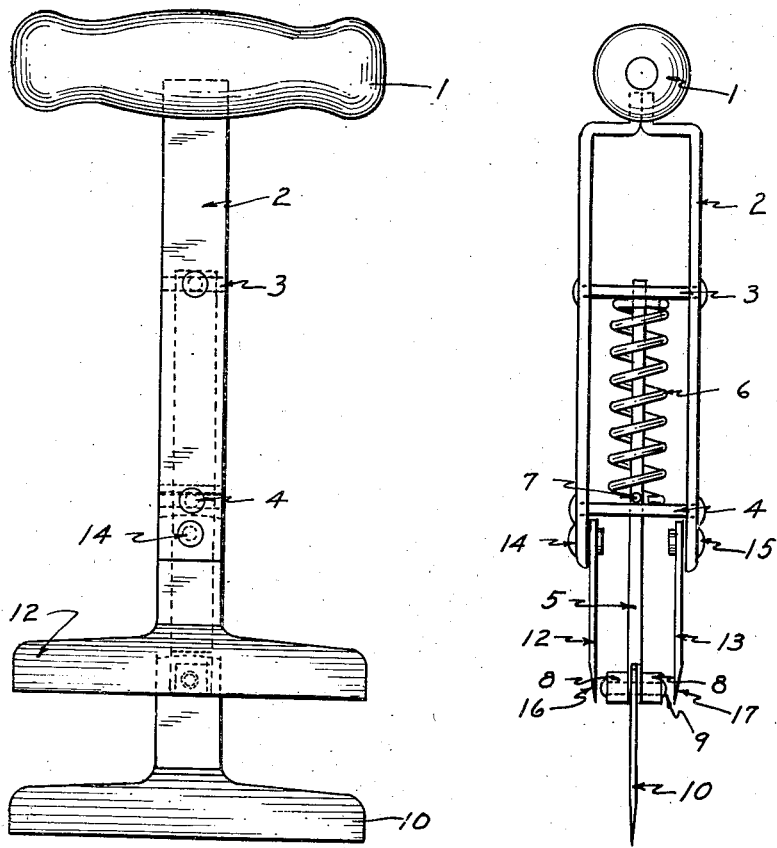
Figure 3:
Figure 4:
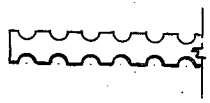

Fig. 1 is a side elevation of the chopper. Fig. 2 is an elevation looking toward the vertical ends of the blades. Fig. 3 is a detail of the upper end of a blade stem or tang. Fig. 4 is an enlarged sectional detail of a portion of a corrugated blade.

A cross bar 1 is rigidly fixed to the upper end of a skeleton frame 2 between the spaced sides of which are spaced, tie bearings 3 and 4, with ends riveted in the frame, which have oblong slots slidably guiding a shaft 5. A spring 6 reacts between the bearing 3 and a pin 7 in the shaft 5 and thrusts the pin 7 against the bearing 4.

Food stripping blocks 8—8 are arranged on opposite sides of the end of the shaft 5 below the bearing 4, and a bolt 9, or other suitable means, fastens the blocks and a central cutting blade 10 to the shaft 5; the blade having a pivoting action in a slot in the shaft end.

The sides of the blade 10 are vertically corrugated to reduce food adherence and its cutting edge may be curved.

Shearing blades 12 and 13, parallel to blade 10 are tiltably secured at 14 and 15 against the inside faces of the lower ends of the handle frame and have only the outer sides of the cutting edges bevelled at 16—17; the blades including upright tangs whose top edges are curved, Fig. 3, to rock clear of the cross bearing 4.

The spring 6 normally holds blade 10 in advance of the lateral blades 12—13 and after blade 10 makes its cutting stroke further pressure on handle 1 compresses the light spring 6 and blades 12—13 move down and make cuts parallel to the center blade and cuts the material being chopped into strips. Then by turning the chopper a quarter of a circle squares of the material will be made. As the chopper is lifted from cutting position the spring 6 projects the blade 10 and the outwardly moving blocks 8 strip any food which might be adhering to the inside faces of the blades 12—13.

I claim:

1. A hand operated food chopper including an elongated handle frame; said frame including parallel, side shanks, spaced, transverse bearings fixed to and between the shanks, a shaft non-turnably slidable in said bearings, a spring disposed on the shaft between the bearings and pressing the shaft downward, means to limit the downward movement of the shaft, a knife blade mounted on the lower end of the shaft, and knife lateral blades attached to the shank ends on each side of and parallel to the shaft blade; the last named blade normally projecting beyond the lateral blades, whereby to be the first in cutting effect when the chopper is in use.

2. A chopper as set forth in claim 1 and in which the side blades have a stroke length downwardly about equal to the projection of the center blade to bring their cutting edges into the plane of the cutting edge of the center cutting blade when this is stopped in cutting function.

3. A chopper as set forth in claim 1, and in which the shaft is provided with stripping blocks working between the lateral blades to strip food therefrom as the center blade moves out after making a cutting stroke.

MELVIN HIGGS.